United States Patent
Wei et al.

(10) Patent No.: US 8,837,789 B2
(45) Date of Patent: Sep. 16, 2014

(54) SYSTEMS, METHODS, APPARATUSES, AND COMPUTER PROGRAM PRODUCTS FOR COMPUTER AIDED LUNG NODULE DETECTION IN CHEST TOMOSYNTHESIS IMAGES

(75) Inventors: Guo-Qing Wei, Plainsboro, NJ (US); Jian-Zhong Qian, Princeton Junction, NJ (US); Li Fan, Belle Mead, NJ (US); Xiaolan Zeng, Princeton, NJ (US)

(73) Assignee: Edda Technology, Inc., Princeton, NJ (US)

( * ) Notice: Subject to any disclaimer, the term of this patent is extended or adjusted under 35 U.S.C. 154(b) by 680 days.

(21) Appl. No.: 12/818,789

(22) Filed: Jun. 18, 2010

(65) Prior Publication Data
US 2010/0322493 A1    Dec. 23, 2010

Related U.S. Application Data

(60) Provisional application No. 61/218,636, filed on Jun. 19, 2009.

(51) Int. Cl.
*G06K 9/00* (2006.01)
*G06T 7/00* (2006.01)

(52) U.S. Cl.
CPC .......... *G06T 7/0083* (2013.01); *G06K 2209/05* (2013.01); *G06T 7/0014* (2013.01); *G06T 2207/10112* (2013.01); *G06T 2200/04* (2013.01); *G06T 2207/30064* (2013.01); *G06T 7/0097* (2013.01); *G06K 2209/051* (2013.01); *G06T 2207/20081* (2013.01)
USPC .......................................................... 382/128

(58) Field of Classification Search
USPC ........................................ 382/128, 131–132
See application file for complete search history.

(56) References Cited

U.S. PATENT DOCUMENTS

| 6,282,307 B1 | 8/2001 | Armato, III et al. .......... 382/132 |
| 6,483,934 B2 | 11/2002 | Armato, III et al. .......... 382/132 |

(Continued)

FOREIGN PATENT DOCUMENTS

| JP | 2002-503861 A | 2/2002 |
| JP | 2003-180678 A | 7/2003 |

(Continued)

OTHER PUBLICATIONS

Notification of First Office Action issued in connection with Chinese Application No. CN 201080027245.3 on Nov. 5, 2012 (8 sheets), and English Translation (7 sheets).

(Continued)

*Primary Examiner* — Michael Fuelling
(74) *Attorney, Agent, or Firm* — Fitzpatrick, Cella, Harper & Scinto

(57) ABSTRACT

A procedure for image segmentation of a lung in tomosynthesis images includes determining a focal plane image of a lung from among a plurality of tomosynthesis images, determining boundaries of the lung in the focal plane image based on a sequence of best-path algorithms cascaded together, assembling the tomosynthesis images to obtain a 3D image of the lung, determining a boundary of a rib in the 3D image of the lung, and segmenting the lung based on the boundaries of the lung and the boundary of the rib. A procedure for detecting nodules in tomosynthesis images includes generating a blurred nodule template, generating a blurred vessel template and a blurred rib template, determining, based on the blurred nodule template, a nodule candidate in 3D image of a lung, and determining, based on the blurred vessel template and a blurred rib template, that the nodule candidate is a nodule.

13 Claims, 18 Drawing Sheets

(56) References Cited

U.S. PATENT DOCUMENTS

| | | | |
|---|---|---|---|
| 6,724,925 B2 | 4/2004 | Armato, III et al. | 382/132 |
| 6,901,132 B2 | 5/2005 | Eberhard et al. | 378/23 |
| 6,993,174 B2 | 1/2006 | Fan et al. | 382/131 |
| 7,623,692 B2 * | 11/2009 | Schildkraut et al. | 382/128 |
| 7,965,893 B2 | 6/2011 | Wu et al. | 382/199 |
| 7,978,886 B2 * | 7/2011 | Claus et al. | 382/128 |
| 2002/0028008 A1 * | 3/2002 | Fan et al. | 382/131 |
| 2003/0086599 A1 * | 5/2003 | Armato et al. | 382/131 |
| 2005/0002550 A1 * | 1/2005 | Jabri et al. | 382/131 |
| 2005/0135707 A1 | 6/2005 | Turek et al. | |
| 2007/0019846 A1 * | 1/2007 | Bullitt et al. | 382/128 |
| 2008/0269598 A1 | 10/2008 | Buelow et al. | |

FOREIGN PATENT DOCUMENTS

| | | |
|---|---|---|
| JP | 2003-265463 A | 9/2003 |
| JP | 2005-013738 A | 1/2005 |
| JP | 2006-175036 A | 7/2006 |
| JP | 2006-325937 A | 12/2006 |
| JP | 2006-346465 A | 12/2006 |
| JP | 2008-043757 A | 2/2008 |

OTHER PUBLICATIONS

E.W. Dijkstra "A Note on Two Problems in Connection with Graphs", Jun. 11, 1959, Numerische Mathematik 1, pp. 269-271.

N. Baba et al. "Stellar speckle image reconstruction by the shift-and-add method", May 15, 1985, Applied Optics, vol. 24, No. 10, pp. 1403-1405 (1985).

T.M. Cover and P.E. Hart "Nearest neighbor pattern classification", Jan. 1, 1967, IEEE Transactions of Information Theory, vol. IT-13, No. 1, pp. 21-27.

Dehmeshki et al., "A Hybrid Approach for Automated Detection of Lunch Nodules in CT Images", Biomedical Imgaging: Macro to Nano (Apr. 6, 2006) 506-09, XP010912678.

Li et al., "Computer-aided Diagnostic Scheme for Lung Nodule Detection in Digital Chest Radiographs by Use of a Multiple-Template Matching Technique", Medical Physics, vol. 28, No. 10 (2001) 2010-76, XP012011304.

Giger et al., "Computerized Detection of Pulmonary Nodules in Computed Tomography Images", Investigative Radiology, vol. 29, No. 4 (1994) 459-65, XP008024742.

\* cited by examiner

SYSTEMS, METHODS, APPARATUSES, AND COMPUTER PROGRAM PRODUCTS FOR COMPUTER AIDED LUNG NODULE DETECTION IN CHEST TOMOSYNTHESIS IMAGES

CROSS REFERENCE TO RELATED APPLICATION

This application claims the benefit of priority of U.S. Provisional Patent Application No. 61/218,636, filed Jun. 19, 2009, the disclosure of which is hereby incorporated by reference herein in its entirety, as if set forth fully herein.

BACKGROUND

1. Technical Field

Example aspects herein relate in general to medical image processing, and, more particularly, relate to systems, methods, apparatuses, and computer program products for computer aided lung nodule detection in tomosynthesis images.

2. Technical Background

Tomosynthesis is an emerging imaging modality for chest examinations. Using this modality, more lung lesions can be detected than when using computerized radiography (CR) or digital radiography (DR). Moreover, tomosynthesis scans result in far lower x-ray dosages than do computed tomography (CT) scans.

Typically, more than 40 images (or "slices") are reconstructed from a tomosynthesis scan. Because of this large amount of data, and the potential that a radiologist may miss lesions while reviewing images, computer aided detection (CAD) systems for lung nodule detection in tomosynthesis images may be used to fully exploit the advantages provided by tomosynthesis.

However, existing lung nodule detection methods for CR/DR and CT modalities are not easily applied to tomosynthesis because tomosynthesis images have different characteristics than CR, DR, and CT images. For example, a complete tomosynthesis scan may have a slice thickness of 10 mm or greater and a slice interval of around 5 mm. These numbers yield approximately 40 slices in a tomosynthesis scan, which is far less than the number of slices in a typical CT scan. Furthermore, due to a blurring effect in tomosynthesis images, an anatomic structure may appear blurred in images other than the corresponding focal plane of the structure. That is, a structure may appear mostly clear in its focal image, but blurred in neighboring images. Accordingly, there is a need for lung nodule detection that accounts for these characteristics of tomosynthesis images.

Moreover, lung nodule detection generally is performed on medical images in which the lungs have been segmented from other anatomic structures like the heart and spine. Lung segmentation approaches for other modalities, such as chest x-ray images or chest CT images, cannot readily be applied to tomosynthesis images. In a tomosynthesis chest image, lung areas typically do not show strong contrast as in chest x-ray images, and there is 3-dimensional (3D) information available in tomosynthesis images, while in chest x-ray images there is no such 3D information. Furthermore, it does not have a calibrated pixel value in Hounsfield units, as CT chest images do. Accordingly there is a need for lung segmentation that identifies both the lung area and the rib structures.

SUMMARY

Existing limitations associated with the foregoing and other limitations can be overcome by a procedure for lung segmentation in tomosynthesis images and a procedure for detecting nodules in tomosynthesis images, and systems, methods, apparatuses, and computer programs that operate in accordance with the procedures.

In accordance with one example aspect, a procedure for image segmentation of a lung in tomosynthesis images includes determining a focal plane image of a lung from among a plurality of tomosynthesis images, and determining a plurality of boundaries of the lung in the focal plane image based on gradients of pixels in the focal plane image and a sequence of best-path algorithms cascaded together. At least one path determined by at least one of the algorithms provides constraint for at least one other path. The procedure also comprises assembling the plurality of tomosynthesis images to obtain a three-dimensional (3D) image of the lung, determining at least one boundary of at least one rib in the 3D image of the lung based on the boundaries of the lung in the focal plane image and a best-path algorithm, and segmenting the lung based on the plurality of boundaries of the lung and the at least one boundary of the at least one rib.

In accordance with another example aspect, a procedure for detecting nodules in tomosynthesis images includes generating at least one blurred nodule template, generating at least one blurred vessel template and at least one blurred rib template, determining, based on the at least one blurred nodule template, a nodule candidate in a three-dimensional (3D) image of a lung assembled from a plurality of tomosynthesis images, and determining, based on the at least one blurred vessel template and the at least one blurred rib template, that the nodule candidate is a nodule in the 3D image of the lung.

BRIEF DESCRIPTION OF THE DRAWINGS

The inventions claimed and/or described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

DETAILED DESCRIPTION

Figure 1:
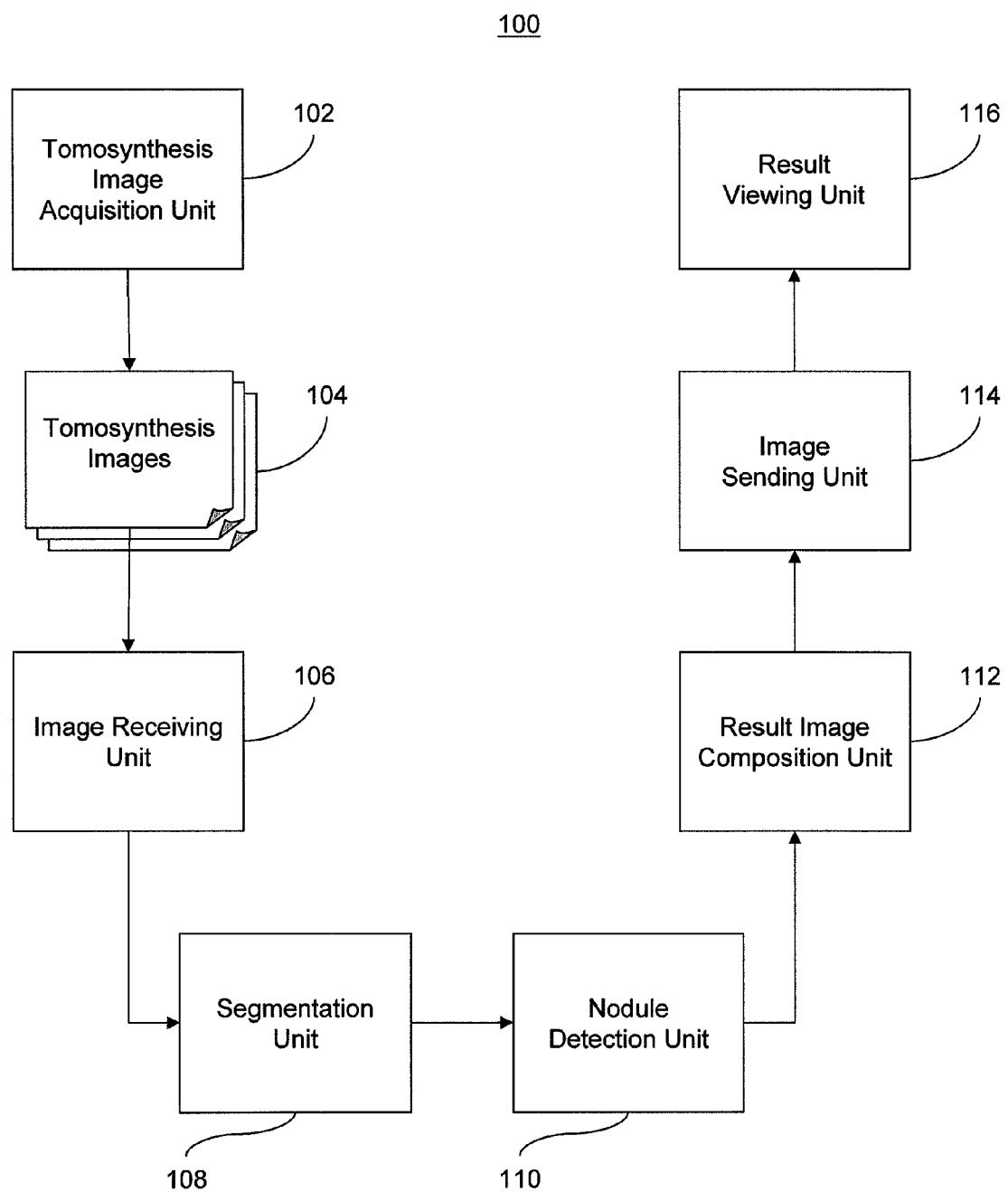
FIG. 1 is a diagram of an example system for segmenting lungs from tomosynthesis images and detecting lung nodules from the segmented images.

Example aspects described herein relate to systems, methods, apparatuses, and computer program products for lung segmentation in tomosynthesis images of a patient's chest. In one example embodiment, lung segmentation is achieved by locating a focal plane image from among multiple tomosynthesis images, determining a plurality of lung-associated boundaries in the single focal plane image, and segmenting the lung in a 3D image by incorporating rib boundaries with the lung boundaries in the focal plane image.

Other example aspects described herein relate to systems, methods, apparatuses, and computer program products for lung nodule detection in tomosynthesis images. In an example embodiment, detection of lung nodules utilizes the image characteristics of tomosynthesis. Specifically, detection may compensate for blurring effects that arise during tomosynthesis image acquisition.

Definitions

Some terms are defined below for easy reference. However, it should be understood that the defined terms are not rigidly restricted to their definitions. A term may be further defined by its use in other sections of the description.

"Anatomic structure" means a part of a living (or once living) creature. Examples of anatomic structures include bones, organs, nerves, arteries, veins, glands, ducts, membranes, muscles, tissues, ligaments, cartilage, tendons, cells, and any parts thereof.

"Central focal plane" refers to, for example, any focal plane (and a slice containing that focal plane) that passes through (or nearest to) a center of an object. Imaging modalities typically obtain images having various focal planes. Thus, the objects being imaged by a modality may be focused (in-plane) in some images and out-of-focus (out-of-plane) in other images. For example, a chest tomosynthesis scan may obtain several slices in which a nodule is visible. The central focal plane of the nodule, however, is a slice having a focal plane that is closest to the center of the nodule. Depending on the imaging modality used, an object may have multiple central focal planes.

"Focal plane" means, in at least one example, a plane in which image data is focused. Objects in the focal plane are referred to as "in-plane," while objects outside the focal plane may be referred to as "out-of-plane." In-plane objects typically appear sharp in images and out-of-plane objects typically appear blurred. In some imaging modalities, a scan may produce slices having focal planes that are rotated about a common axis. On the other hand, a scan in other imaging modalities may produces slices having parallel focal planes. Moreover, some modalities may generate (or otherwise obtain) slices having different focal planes by using one or more digital processing procedures.

"Image" refers to image data or images presented for display or presentation to a user by processing image data. Image data may be, for example, stored in analog format (e.g., films and analog video formats such as NTSC and PAL) or digital format (e.g., digital detector output files, raw image files, raster image files, vector image files, 3D image files, and digital video formats such as MPEG and DV). Examples of images presented for display include pictures, photographs, radiographs, models, movies, videos, fly-throughs, and screen displays. Where image data is processed to present an image to a user, such processing may include, by example only, developing, printing, projecting, or rendering image data. As examples, a computer may render a two-dimensional image from a single slice, or it may render a three-dimensional image from multiple slices.

"Segmentation" means distinguishing a region of one or more pixels from image data. In medical imaging, image data typically contains information (e.g., pixels) that corresponds to multiple anatomic structures. Oftentimes, however, the imaging modalities used to obtain such image data do not distinguish among the anatomic structures. Accordingly, segmentation procedures may be performed to isolate a desired anatomic structure from the image data by, for example, by locating boundaries in image data. An isolated anatomic structure may be considered "segmented," and the pixels of the structure may be referred to as the "segment" of that structure. Segmented image data and its associated images (whether 2D or 3D) may be used, for example, to diagnose anatomic structures, measure volumes and capacities of anatomic structures, and plan surgical treatments. Known segmentation techniques include region growing and atlas- and model-based algorithms.

"Slice," "image slice," and the like mean, for example, a digital image (e.g., pixels) resulting from the exposure of imaging energy to an object. Sources of imaging energy include, for example electromagnetic radiation (e.g., x-rays, gamma rays, microwaves, and other electromagnetic fields such as visible light and magnetic waves), acoustic waves (e.g., ultrasound waves), particles (e.g., electrons, neutrons, and ions), radioactive decay (e.g., nuclear medicine) and combinations thereof. Some types of imaging equipment ("modalities") control the source and/or detection of imaging energy such that a slice corresponds to a relatively thin cross-section of the imaged object. In such modalities, the slice thickness (e.g., along the z-axis in Cartesian coordinates) may be much less than the slice size (in the x-y plane). In some modalities, a scan may generate more than one slice. Similarly, some modalities may be configured to divide a single slice (resulting from a single exposure) into multiple slices, for example, by digital image processing. Where multiple slices of an object are obtained and each slice is of a different cross-section of the imaged object, the slices may be digitally assembled in various ways to yield two- and three-dimensional views of the imaged object.

"Scan", in one example, means a set of image data collected during the operation of an imaging modality. A scan may include one or more slices. An example of a scan is a tomosynthesis scan.

Lung Segmentation and Nodule Detection

FIG. 1 is a diagram of an example system configured to segment a patient's lungs in tomosynthesis images and detect lung nodules in the segmented images. Tomosynthesis image acquisition unit 102 acquires tomosynthesis images 104 (e.g., performs one or more tomosynthesis scans of a patient's chest). The tomosynthesis images 104 are received from the tomosynthesis image acquisition unit 102 by an image receiving unit 106. Image data is processed by a segmentation unit 108, which may include, for example, segmentation of the lungs, heart, spine, and/or diaphragm from the images. Segmented images are then processed by a nodule detection unit 110, which is configured to detect lung nodules by, for example, a template-based procedure that compensates for blurring in tomosynthesis images. Information related to the detected nodules (e.g., location, size, and shape) is used by a result image composition unit 112 to produce one or more result images (2D and/or 3D). A result image may include, for example, an image in which the anatomic structure of the lungs is segmented, and an image in which lung nodules are detected and/or indicated. The result images produced by the result image composition unit 112 are sent by an image sending unit 114 to a result viewing unit 116. From the result viewing unit 116, a user may review or otherwise perceive the result images, which may be used, for example, to diagnose a patient.

Figure 2:
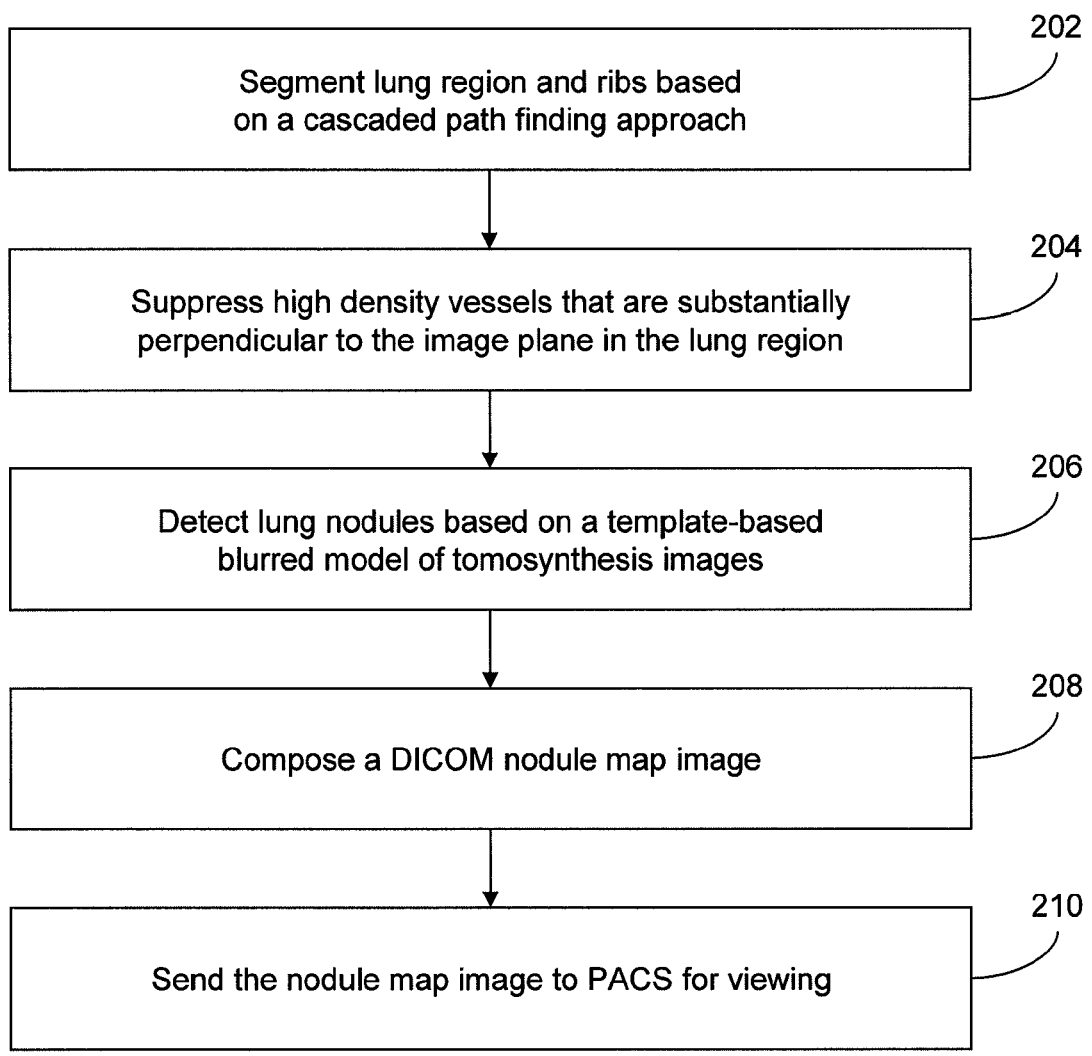
FIG. 2 is a flow diagram of an example procedure that may be performed by the system of FIG. 1.

FIG. 2 is a flow diagram of an example procedure for segmenting the lungs and detecting lung nodules in accordance with one example embodiment herein. At least part of the procedure shown in FIG. 2 may be performed using components of the system shown in FIG. 1. For example, steps 202 and 204 may be performed using the segmentation unit 108, step 206 may be performed using the nodule detection unit 110, step 208 may be performed using the result image composition unit 112, and step 210 may be performed using the image sending unit 114.

At step 202, lung regions and rib structures are identified from tomosynthesis images 104 based on a path finding approach (algorithm). The approach is based on anatomical knowledge (e.g., typical location of anatomical features) and a sequence of best-path algorithms cascaded together, so that at least one determined path may provide constraints for finding other paths. Examples of such approaches (algorithms) are discussed further below in connection with FIGS. 3A-3L.

At step 204, high density vascular structures are suppressed from the tomosynthesis images. For example, vascular structures that are perpendicular to or nearly perpendicular to the imaging plane may appear as bright, high density pixels. Suppression of such pixels may reduce their negative impact on any subsequent nodule detection. An example procedure for suppressing high density pixels is discussed below in connection with FIG. 4.

At step 206, lung nodules are detected. As part of nodule detection, a blurring model may be established to simulate the blurring effects of tomosynthesis image acquisition. Examples of nodule detection and blurring modeling are discussed below in connection with FIGS. 6A through 6C, 7A, and 7B. Blurring models may be used to construct certain nodule, vessel and rib templates, which may then be integrated into a lung nodule detection process. Detected nodules may be represented in the form of nodule locations, such as in-plane coordinates, coupled with slice numbers.

The results of nodule detection are used to form one or more Digital Imaging and Communication in Medicine (DICOM) images (or other suitable image types) at step 208. In an example embodiment, result images are generated by arranging different tomosynthesis slices. As an example, only those slices in which nodules are detected may be selected for the assembly. Such slices may be organized as a rectangular grid, with a configurable number of rows and columns. Detected nodule locations may be indicated (either manually in response to user input or automatically, for example, by using nodule information determined by a nodule detection unit, such as unit 110) on the result images and/or slice. An indicator for a nodule location in such a result image may be, in one example, a circle with a nodule center at the center of the circle. Other shapes may also be employed as such a location indicator. As another example, a 3D result image may be generated by assembling different slices into a single image.

The DICOM images are sent to a result viewing unit at step 210. In one example embodiment, the result viewing unit is a Picture Achieving and Communication System (PACS) environment. In this embodiment, the DICOM result images are stored in a PACS server and viewed at PACS workstations.

Lung Segmentation

Figure 3A:
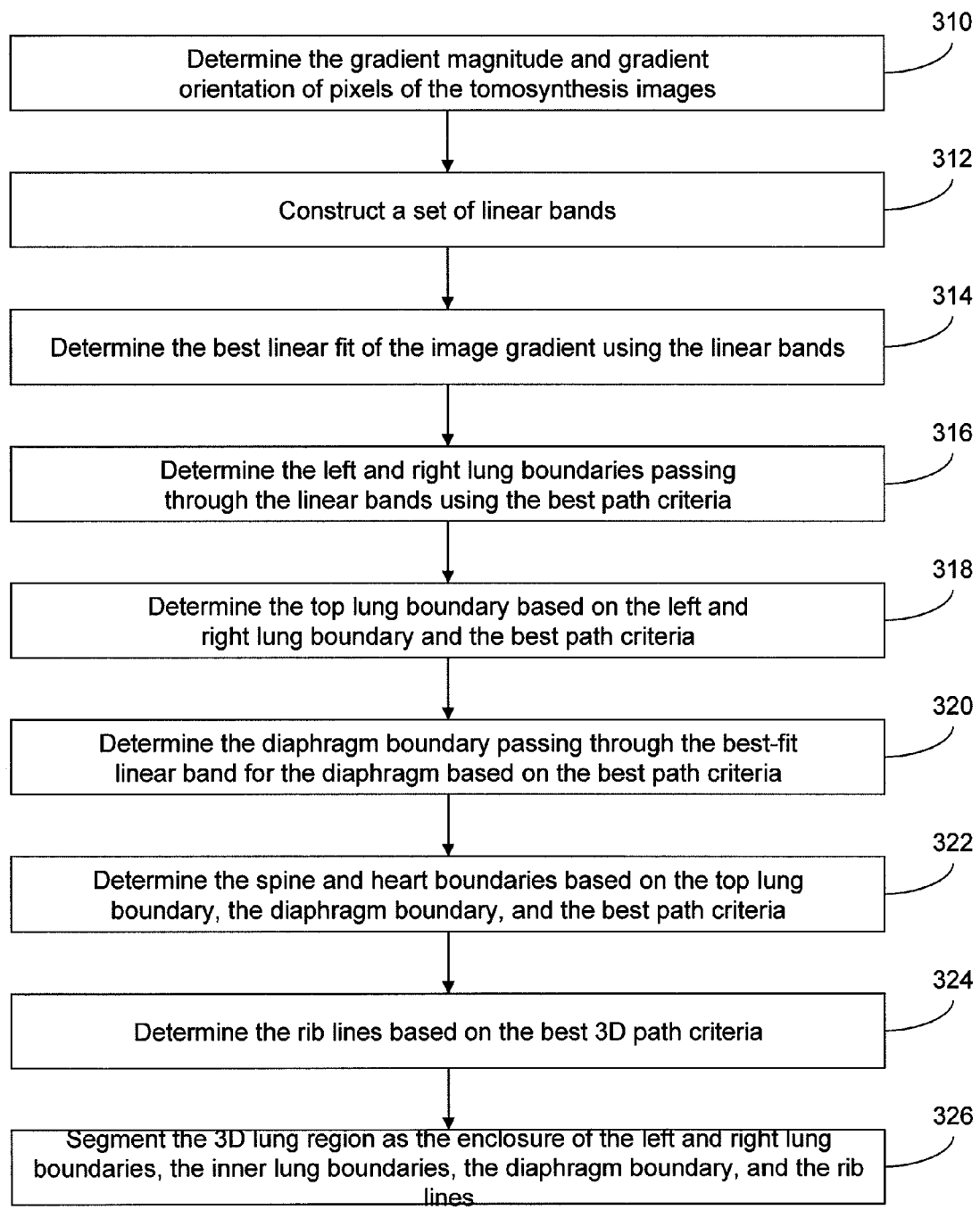
FIG. 3A is a flow diagram of an example procedure for lung region identification.

FIG. 3A is a flow diagram of an example procedure for identifying and segmenting lung regions and ribs from tomosynthesis images. This example procedure may be used, for example, in the performance of step 202 of FIG. 2. Generally speaking, the procedure segments the lung areas and the rib structures in tomosynthesis images by incorporating anatomic knowledge into a cascaded, path finding approach. The procedure of FIG. 3A is described with additional reference to FIGS. 3B through 3L.

At step 310, a gradient magnitude and gradient orientation are computed for pixels of the tomosynthesis images. The intensity of a pixel may be proportional to (or otherwise depend on) a density of an object (or part of an object) imaged by that pixel. As a result, a boundary between objects having different densities (e.g., a boundary between bone and tissue) may correspond to a difference in pixel intensity between a pixel that images one object and a pixel that images another object. Accordingly, as one example, a gradient magnitude computed at step 310 may be a difference in intensity between at least one pixel and its neighboring pixels. Also as one example, a pixel may have a high gradient magnitude where it has a high intensity and its neighboring pixels have a low intensity.

Gradient orientation refers to a direction in which a gradient occurs. In some imaging modalities, multiple slices of an imaged object are generated, where each slice corresponds to a different cross-section of the imaged object. In one example embodiment, the plane of a slice (e.g., the cross-section of the object) defines an x-y plane. The x- and y-axes may be orthogonal. Where there are multiple slices, the slices may be parallel to each other, and the slices thus are arranged along a z-axis that is orthogonal to the x-y plane. As one example, where a tomosynthesis scan is performed on a patient's chest, the plane of each slice may be parallel to the patient's coronal plane, and the z axis thus lies in the patient's sagittal plane. Accordingly, a pixel from the tomosynthesis scan may have neighboring pixels in the same slice as the pixel (e.g., offset in an x-y plane parallel to the coronal plane) and/or in an adjacent slice (e.g., offset in a z direction parallel to the sagittal plane).

Computation of gradient orientation determines a direction in which a gradient magnitude occurs. For example, if a pixel has in-plane neighboring pixels (e.g., pixels in the same slice) with the same intensity but an out-of-plane neighboring pixel (e.g., a pixel in an adjacent slice in the z-direction) with a lower intensity, the gradient magnitude may be the difference between the two intensities, and the gradient orientation may be in the z-direction. Gradient orientation and magnitude at each pixel may be expressed as a vector (e.g., [x-magnitude, y-magnitude, z-magnitude]), matrix (e.g., rows and columns of pixel neighbors and elements indicating gradient magnitudes), array, databases, or any other suitable data structure.

In one example embodiment, gradient magnitude and orientation are computed in step 310 for pixels that have intensities above a certain, predetermined threshold. The threshold may be automatically or empirically determined. The threshold may be selected in order to segment certain anatomic structures, such as bone, diaphragm, and spinal structures, which may have higher intensity pixels than lung structures.

At step 312, linear bands of different orientations are generated. By human anatomy, the left- and right-most lung boundaries in the central focal plane of the lungs (e.g., the outer boundaries of the right and left lungs) are roughly vertical and coincide with the ribs. Accordingly, the linear bands may be used to find an approximate location for the left-most and right-most boundaries of the lung region through an approach that incorporates these anatomic features. The bands may have a predefined width and length based on, e.g., anatomic knowledge or experimental results. As one example, where a patient is six feet tall, an approximate size of the patient's lungs may be known from human anatomic knowledge. This size, in turn, may be used to define the width and length of the linear bands.

At step 314, a best fit of linear bands is used to identify the tomosynthesis slice corresponding to the central focal plane of the lungs and containing the left-most and right-most lung boundaries. In a tomosynthesis slice corresponding to the central focal plane of the lungs, a patient's ribs typically generate a near-linear vertical (e.g., along the y-axis of the slice) lung boundary with high image gradients. Because high gradients may be the most reliable features for obtaining accurate lung segmentation results, the slice in this plane may be the most suitable slice for determining the left- and right-most lung boundaries (e.g., the locations of the left rib segments and the right rib segments), as well as for use in performing steps of a segmentation procedure, e.g., steps 316 through 326 described below.

In one example embodiment, a best fit among multiple linear bands is the band having the highest sum of gradient magnitudes. As one example, the sum may be determined by adding the gradient magnitudes for each pixel in the band. As another example, the sum may be determined by adding the gradient magnitudes for only some of the pixels in the band.

Constraints may be applied in the gradient summation. For example, only pixels having a gradient magnitude above a predetermined threshold may be included in the summation. As but another example, only pixels having a gradient orientation within a pre-defined difference range (with respect to the orientation of the linear band) may be used in the gradient summation. Moreover, the sum need not be obtained by simple addition of pixel gradient magnitudes. For example, the sum may be weighted (e.g., higher gradient magnitudes are given more weight) or the sum may be averaged (e.g., total gradient magnitude divided by number of pixels).

In one example embodiment, the central focal plane of the lungs corresponds to a slice of a tomosynthesis scan that is parallel to the patient's coronal plane, and thus the left-most and right-most boundaries of the lung region are identified in the same tomosynthesis slice. However, in another example embodiment, the slice in which the left-most lung boundary is identified is different from the slice in which the right-most lung boundary is identified. This may occur, for example, where the patient's coronal plane is not parallel any slice obtained from the tomosynthesis scan. Where this occurs, the linear bands constructed at step 312 may be constructed in different slices.

Figure 3B:
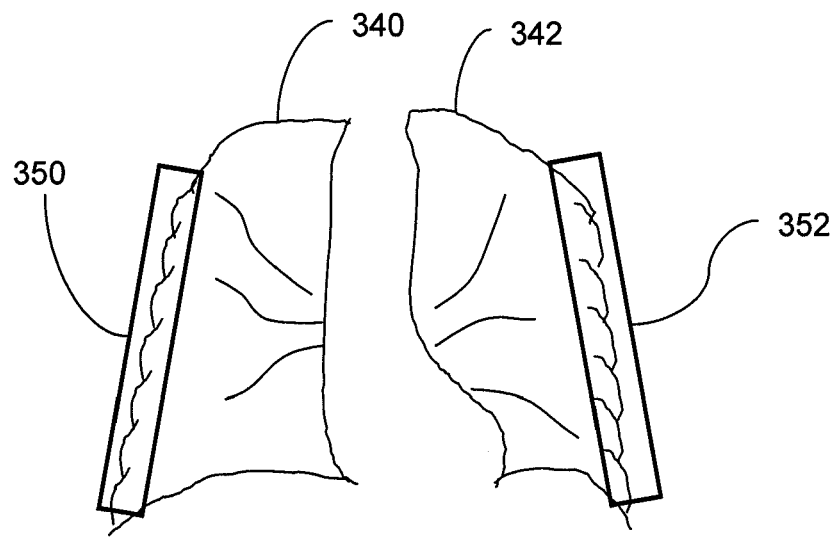
FIG. 3B is an illustration of an example construct of linear band fitting for determining left-most and right-most lung boundaries.

FIG. 3B shows an example of best fits to the left-most and right-most lung boundaries, and is one example of a result of step 314 above. Because the best fit is of linear bands, the example of FIG. 3B includes two bands, one for the left-most lung boundary and one for the right-most lung boundary. Specifically, the figure shows left lung 340 with linear band 350 and right lung 342 with linear band 352. As described above, in an example embodiment, a fit with the highest gradient summation within the band may be used to determine the best fits of linear bands 350 and 352.

Figure 3C:
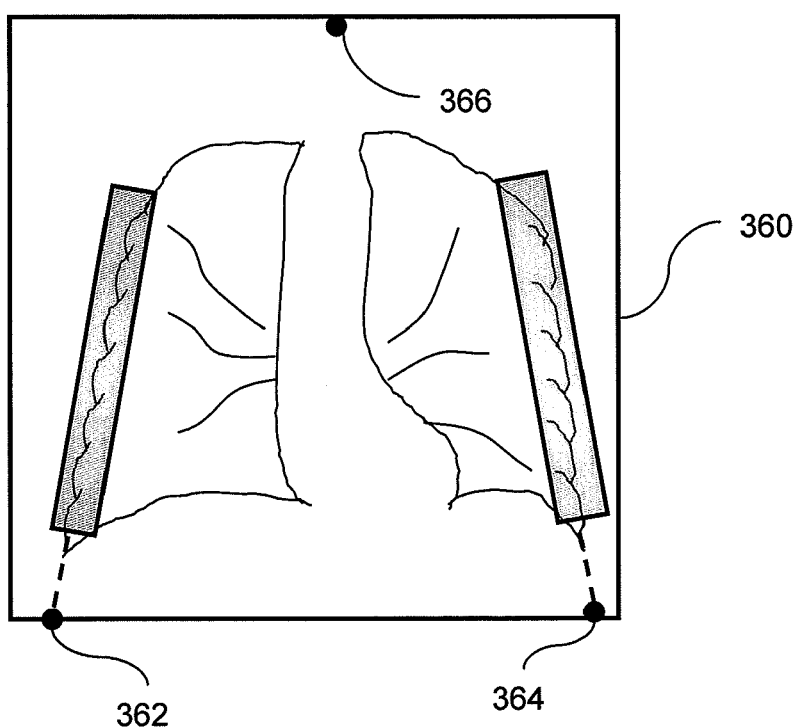
FIG. 3C is an illustration of an example construct of a starting point and an ending point for determining left-most and right-most lung boundaries.
Figure 3D:
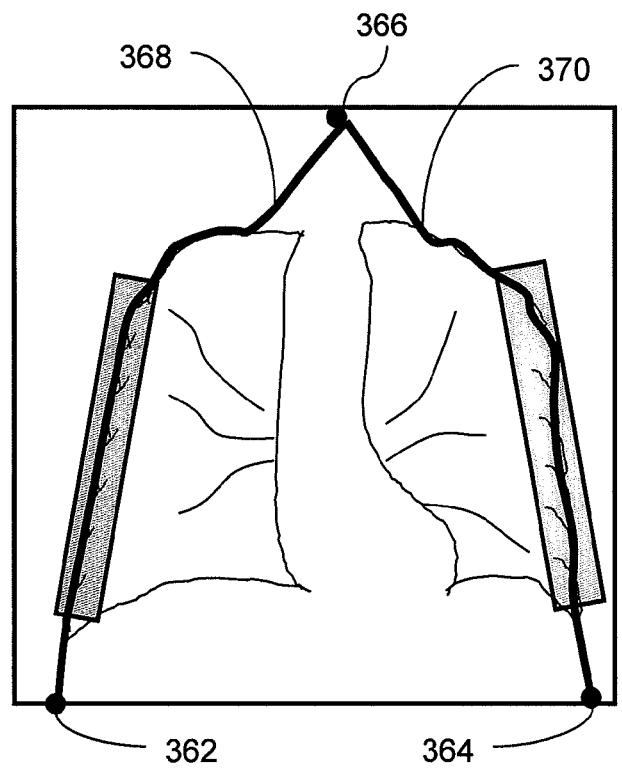
FIG. 3D is an illustration of two paths that connect the starting point and ending points of FIG. 3C and pass through the linear bands of FIG. 3B.

Referring back to FIG. 3A, generally speaking, steps 316 through 322 determine the lung boundaries in the central focal plane of the lungs. The left-most and right-most lung boundaries are determined at step 316. An example of this step is illustrated by FIGS. 3C and 3D. FIG. 3C shows an example construct of a starting point and an ending point for determining left-most and right-most lung boundaries. The central lines of the left and right linear bands are extended to intersect with the bottom of image border 360 at left ending point 362 and right ending point 364. A starting point 366 is selected from the top of the image border 360. The location of starting point 366 may be automatically, in one example. For example, starting point 366 may be predetermined as a centering pixel of image border 360. From the starting point 366 to left ending point 362, a best path that passes through the left linear band is determined. The best path is one with the least cost along the path. Similarly, from the starting point 366 to right ending point 364, a best path that passes through the right linear band is determined.

In an example embodiment, the cost of a path is defined as the summation of the cost at each pixel on the path. In turn, the cost at each pixel is the inverse of the image gradients. This is obtained by masking out pixels to the left and right of the linear band and using an optimization method. One optimization method is Dijkstra's shortest path algorithm, as discussed in E. W. Dijkstra, *A Note on Two Problems in Connection with Graphs*, Numerische Math. 1, 269-271 (1959), the content of which is incorporated by reference herein in its entirety as if set forth fully herein. In one example embodiment, the best path described above is determined in accordance with that algorithm.

FIG. 3D shows left and right best-fit paths 368 and 370 that connect the starting point 366 and the left and right ending points 362 and 364. These paths coincide with the left-most and right-most lung boundaries in the central focal plane.

Figure 3E:
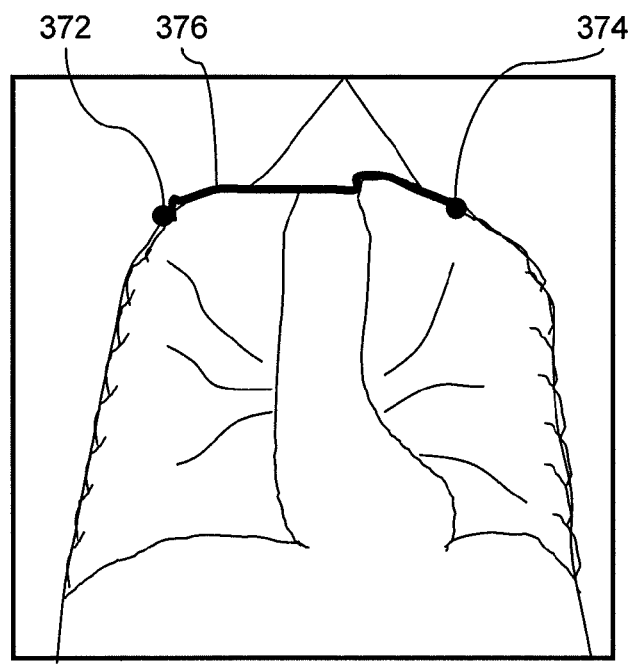
FIG. 3E is an illustration of an example construct of path finding between a starting point on a left lung boundary and an ending point on a right lung boundary for determining the top boundary of the lung.

At step 318, the top lung boundary is determined. The top boundary may be determined by a least cost approach as described above in connection with step 316. Specifically, as shown in FIG. 3E, a point 372 is selected on the left-most best-fit path. In one example, the point 372 may be chosen as one-quarter of the length of the left-most best-fit path, as determined from the starting point, although this example is non-exclusive. Similarly, a point 374 is selected on the right-most best-fit path. The best path between points 372 and 374 is the path of least cost between those points. Such a path is shown in FIG. 3E as top best-fit path 376. The top best-fit path 376 coincides with the top lung boundary in the central focal plane of the lungs.

At step 320, a thoracic diaphragm boundary is determined. In human anatomy, the thoracic diaphragm forms the lower boundary of the lungs. Accordingly, step 320 may determine the boundary between the lungs and the thoracic diaphragm.

Figure 3F:
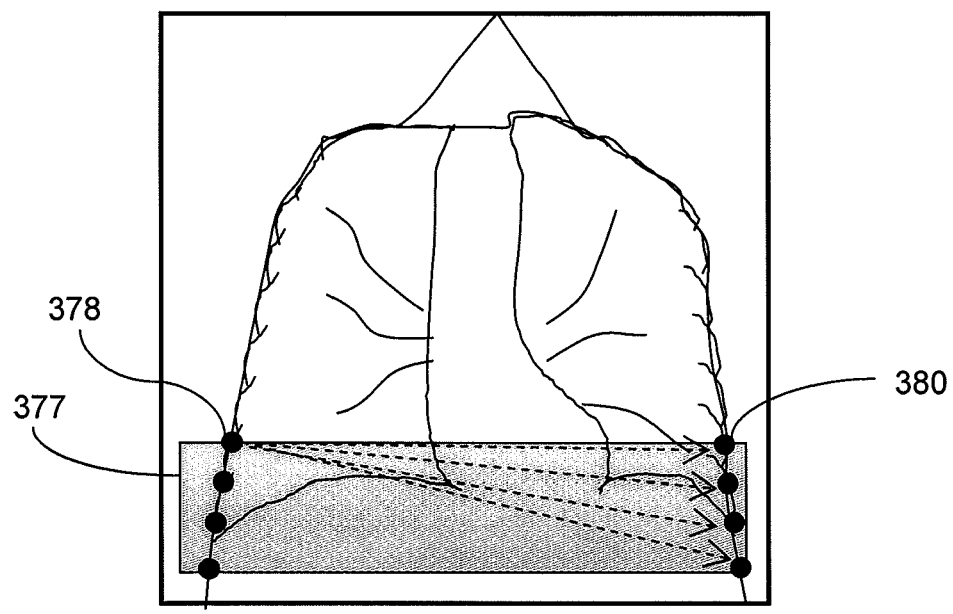
FIG. 3F is an illustration of an example construct of path finding for determining the boundaries of the diaphragm.
Figure 3G:
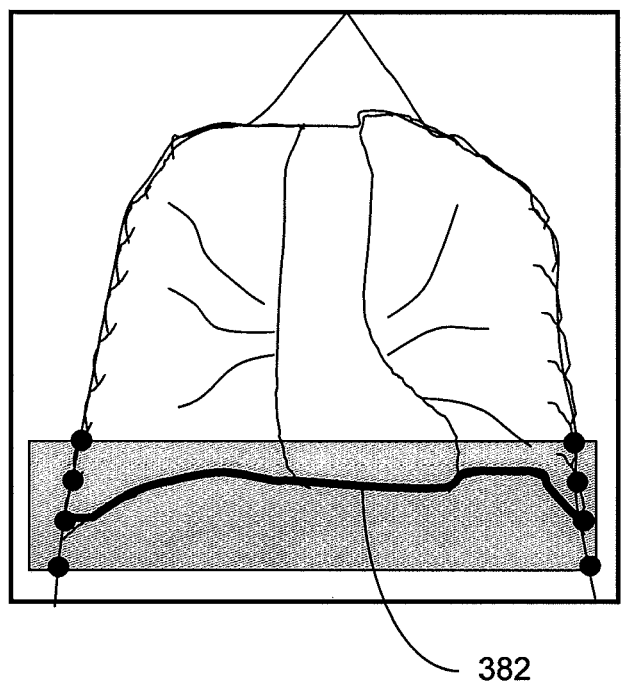
FIG. 3G shows a path that coincides with the boundaries of the diaphragm of FIG. 3F.

At least parts of step 320 are represented in FIGS. 3F and 3G. A horizontal linear band 377 is constructed, as shown in FIG. 3F. Dimensions and location of horizontal linear band 377 are determined such that the diaphragm boundary will be located within the band. For example, the location of the vertical edges of the band may be positioned to encompass a portion of the left- and right-most lung boundaries, as determined at step 316. As another example, the height of the band may encompass possible locations of a diaphragm boundary based on a known range determined by human anatomy. One or more features of the horizontal band 377 (e.g., height, width, vertical edge location) may be determined automatically based on empirical or statistical considerations.

The image of the central focal plane of lungs is then smoothed using a kernel having a size large enough to smooth out major vascular structures in the image. Any suitable smoothing procedure may be used, including Gaussian smoothing and smoothing by a moving average based on a predetermined window size.

Next, a gradient operation is performed on the smoothed image. Specifically, in one example the linear band is adjusted automatically (e.g., moved up and down along the left and right lung boundaries, widened in the x- and/or y-directions, or narrowed in the x- and/or y-directions) to search for high gradient summations therein. As described above, gradient magnitudes typically increase where adjacent pixels image objects having different densities. In this case, the different densities between lung tissue and diaphragm muscle may give rise to increased gradients. In one example embodiment, the best fit linear band is the band having the highest gradient summation. The best fit linear band corresponds to an approximate location of the diaphragm, and can indicate an approximate location of a boundary thereof.

Having determined an approximate location of the diaphragm boundary, a more precise determination may be made. As shown in FIG. 3F, multiple left points 378 and multiple right points 380 are chosen within the linear band 377. In one example embodiment, the left points 378 fall on left best-fit path 368 (shown in FIG. 3D) and the right points 380 fall on right best-fit path 370 (also shown in FIG. 3D). The number, location, and/or spacing of the points may be determined, for example, automatically based on empirical or statistical considerations. For each of the left points 378, a best fit path to each of the right points 380 is determined, as illustrated by the dashed arrows in FIG. 3F. A path among all left-to-right paths that yields the minimum cost is determined as the diaphragm boundary. FIG. 3G shows a best-fit path 382 for the diaphragm. Best-fit path 382 coincides to the diaphragm boundary.

At step 322, the inner boundaries of the lungs in the central focal plane of lungs are determined. In human anatomy, the several anatomic structures (e.g., the heart and surrounding arteries, the trachea, the spine) lie adjacent to the lungs. Accordingly, step 322 may determine the boundaries of those anatomic structures with the lungs (e.g., the cardiac notch).

Figure 3H:
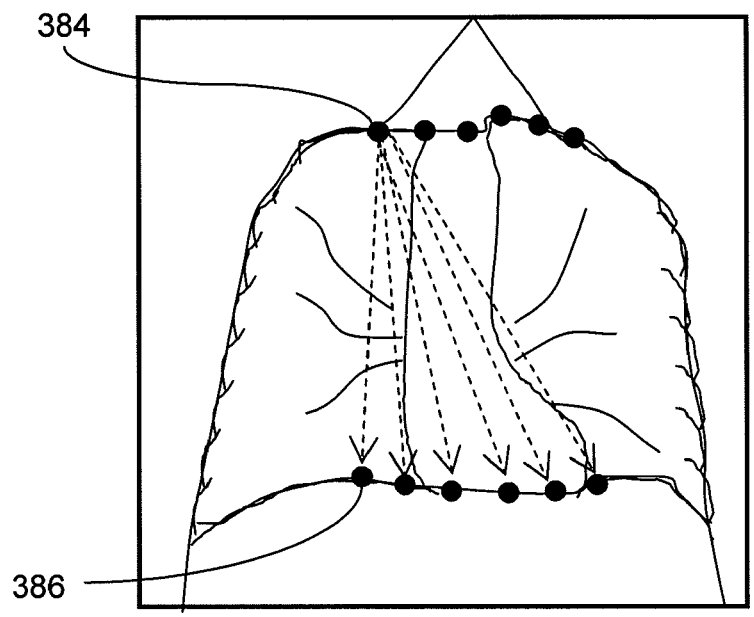
FIG. 3H is an illustration of an example construct of path finding for determining spine and heart boundaries.
Figure 3I:
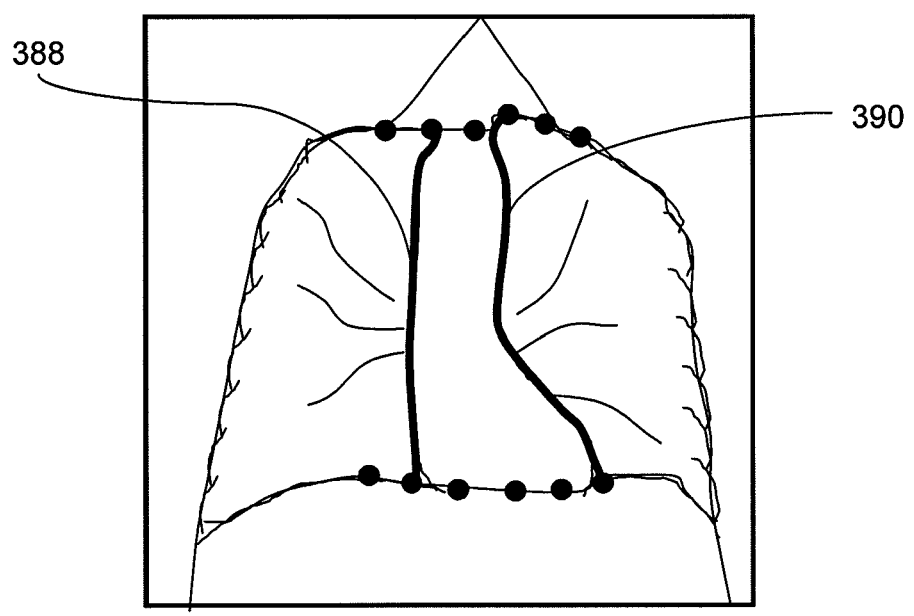
FIG. 3I shows two paths that coincide with the spine and heart boundaries of FIG. 3H.

At least parts of step 322 are illustrated in FIGS. 3H and 3I. A set of top points 384 are selected on the top lung boundary, and a set of bottom points 386 are selected on the diaphragm boundary. The number, location, and/or spacing of the points may be determined automatically based on empirical or statistical considerations, for example. For each of the top points 384, a best-fit path to each of the bottom points 386 is determined. As shown in FIG. 3I, two paths 388 and 390 with the lowest and the second lowest costs are found. These paths coincide with the inner boundaries of the lungs. In particular, path 388 coincides with the left inner boundary and path 390 coincides with right inner boundary.

Figure 3J:
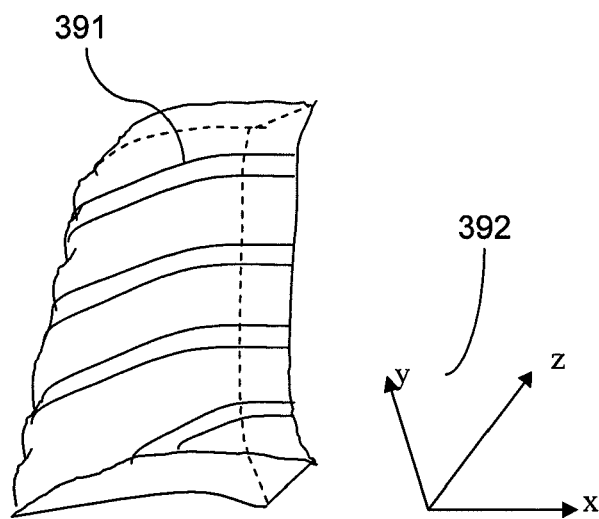
FIG. 3J shows a three-dimensional (3D) depiction of a portion of ribs and lung.

At step 324, rib lines are determined using a 3D best-path approach. While other determination steps (e.g., determining left, right, and top lung boundaries and the diaphragm boundary) may use a central focal plane image of the lungs (e.g., a single tomosynthesis slice), in one example, step 324 segments a 3D image (e.g., an image assembled from multiple slices). FIG. 3J shows a 3D image portion of a lung including rib 391. In coordinate system 392, the x-y plane is the tomosynthesis image plane (e.g., image slices are taken in the x-y plane) and the z-axis indicates the slice direction.

In one example embodiment, all tomosynthesis images are smoothed with a kernel size that is large enough to filter out major vascular structures but that keeps the rib structures. Such smoothing is possible because the rib width typically is larger than the diameter of major vascular structures. After smoothing, image gradients are computed for the filtered images. In these filtered images, rib structures may show higher image gradients, which improves the results from a least cost approach.

Figure 3K:
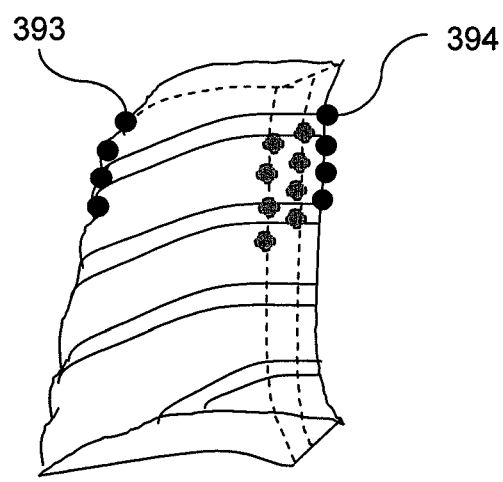
FIG. 3K illustrates an example construct of path finding by placing a set of starting and ending points for determining ribs.
Figure 3L:
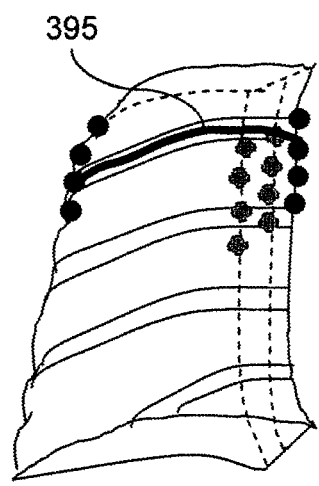
FIG. 3L shows a path that coincides with a rib of FIG. 3K.

With reference to FIG. 3K, a set of points 393 are selected on the left-most lung boundary, and a set of points 394 are selected on the left inner boundary, as extended in the slice direction (e.g., along the z-axis). Next, for each of the points 393 on the left-most lung boundary, a best path to each of the points 394 on the left inner boundary is computed. The path with the lowest cost among all such paths is determined to be the rib line. FIG. 3L illustrates a selected rib line 395.

The procedure discussed in connection with step 324 may be repeated to find all rib structures. Information regarding the rib lines (e.g., location of a rib line in a slice) may be used in a lung nodule detection procedure, as discussed below.

At step 326, the 3D lung region is segmented as the volume enclosing, in one example, the left-most and right-most lung boundaries, the inner lung boundaries, the diaphragm boundary, and the 3D rib lines. The segmented lung region may be output, for example, for further processing (e.g., a nodule detection procedure) or for viewing by a user.

It should be noted that, although described in the context of an example sequence wherein outer lung boundaries are first determined, and then a top lung boundary, etc. are determined, broadly construed, the scope of the invention is not limited only to this sequence order. For example, in other embodiments, the top or bottom lung boundary (or a rib boundary etc.) can be determined first in a similar manner as described above, and other boundaries can be determined afterwards, and constraints for boundaries can be defined by any one or more earlier determined (or other predetermined) boundaries. Thus, the order can be varied depending on applicable operating criteria or the like.

Suppressing High Density Vascular Structures

Figure 4:
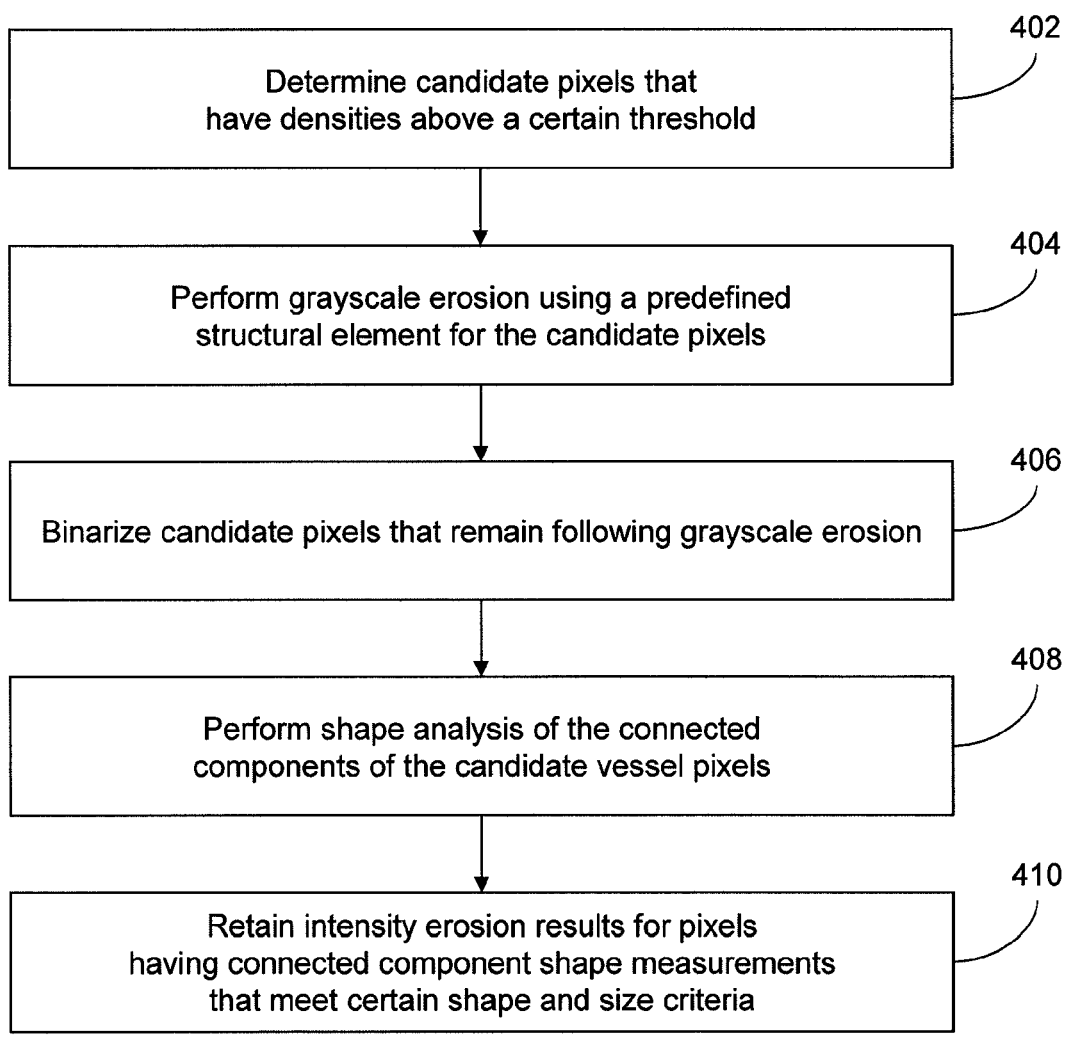
FIG. 4 is a flow diagram of an example procedure for suppressing high density vascular structures.

FIG. 4 is a flow diagram of an example procedure for suppressing high density vascular structures, according to one example embodiment herein. The procedure illustrated in FIG. 4 may be used, for example, to perform step 204 discussed above. High density structures typically are small in size and round in shape. Removal of such structures may be used, for example, to reduce the number of false lesion candidates during nodule detection.

At step 402, pixels having intensities above a predetermined threshold (e.g., pixels of objects above a predetermined density) are selected. Pixels selected at 402 may include candidate pixels for additional processing steps such as those described below in connection with steps 404 through 410. In one example embodiment, the threshold is determined such that intensities of vascular structures are above the threshold and intensities of lung tissue are below. For example, the threshold may be determined as the mean intensity of pixels in the lung region. The threshold may be determined automatically based on empirical or statistical considerations, or it may be specified by, for example, a user.

At step 404, a grayscale erosion is performed on the candidate pixels to suppress any anatomic structures that are likely to be vascular structures. Generally speaking, a grayscale erosion compares a predetermined structural element (e.g., a shape) to image elements (e.g., one or more pixels) to determine the extent to which the shape is similar to the image elements. An image element that is determined to be similar to the predetermined structural element is retained for further analysis. Otherwise, an image element is suppressed. Accordingly, step 404 may include discarding (e.g., suppressing) some candidate pixels selected at step 402.

In one example embodiment, the structural element used at step 404 is predefined such that its kernel shape is round and its kernel size is smaller than the minimum nodule size desired to be detected. This predefined structural element then is used in the erosion to determine any anatomic structures that may be contained within the predefined structural element. Thus, the grayscale erosion at step 404 may be used to determine which image elements (e.g., one or more pixels) in tomosynthesis images correspond to vascular structures that are smaller and/or sized differently than nodules.

At step 406, candidate pixels that remain following grayscale erosion are binarized. Generally speaking, binarization at step 406 converts a grayscale-eroded image to a black and white image. Binarization may be performed by any suitable technique, e.g., region growing.

At step 408, a connected component shape analysis is performed on the binarized pixels. By such analysis, certain pixels may be determined to be part of an object with a particular shape (e.g., round) and within a particular size range. As one example, a group of pixels may be determined to be the size and shape of the predefined structural element used in the grayscale erosion at step 404. The corresponding grayscale erosion results are retained for these pixels, and such structures are suppressed (e.g., not used in performing one or steps of nodule detection procedure) at step 410. Otherwise, the corresponding grayscale erosion results are rejected and structures are not suppressed (e.g., used in performing one or steps of nodule detection procedure).

In an example embodiment, certain shape analysis criteria may be used to define the predetermined structural element at step 404 and/or perform the connected component shape analysis at step 406. These criteria may require, for example, a certain mean size and a certain shape (e.g., circularity of the connected component). For instance, if a mean size is below a predefined threshold and a circularity is above a predefined threshold, the corresponding pixels' grayscale erosion results may be accepted and the corresponding structures suppressed during the performance of a nodule detection procedure.

Nodule Detection in Tomosynthesis Images

As described above, a tomosynthesis scan typically yields slices having various focal planes. Subsequent processing of image scan data may yield other slices, each with its own focal plane. Moreover, tomosynthesis slices often have relatively large thicknesses (as compared to, for example, CT slices). Deblurring algorithms, such as those described in N. Baba, et al., *Stellar speckle image reconstruction by the shift-and-add method*, 24 Applied Optics 1403-05 (1985), thus may not remove blurring effects completely. As a result, anatomic structures visible in an image slice may be blurred due to both the slice thickness and image processing artifacts. Accordingly, a procedure for detecting nodules that accounts for blurring in tomosynthesis images may improve detection accuracy.

Figure 5:
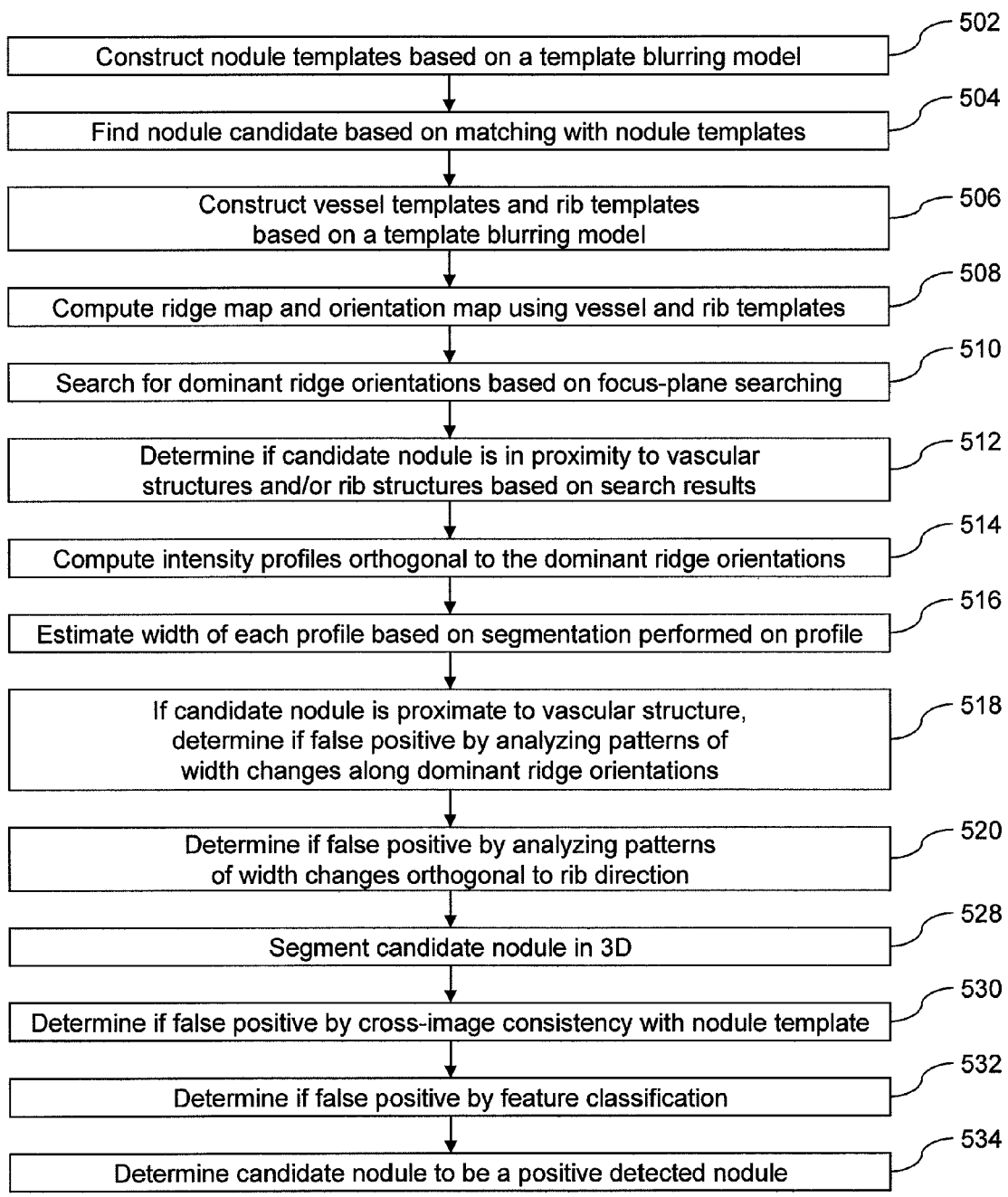
FIG. 5 is a flow diagram of an example procedure for template-blurring based nodule detection.

FIG. 5 is a flow diagram of an example procedure for template-based, blurring model nodule detection, according to an example embodiment herein. The procedure illustrated in FIG. 5 may be used, for example, to perform step 206 described above. Generally speaking, the procedure involves generating nodule templates, vessel templates, and rib templates that exhibit blurring characteristics of tomosynthesis images and comparing these templates to structures in actual tomosynthesis images.

At step 502, nodule templates of various sizes are generated. The nodule templates are generated based on a blurring model that simulates the blurring effects which are visible in images obtained from a tomosynthesis scan (and subsequent processing).

Figure 6A:
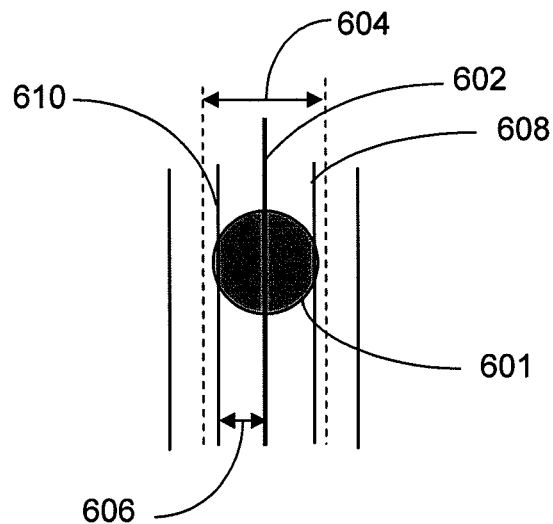
FIG. 6A illustrates relationships between slice thickness, slice spacing and a nodule model.
Figure 6B:
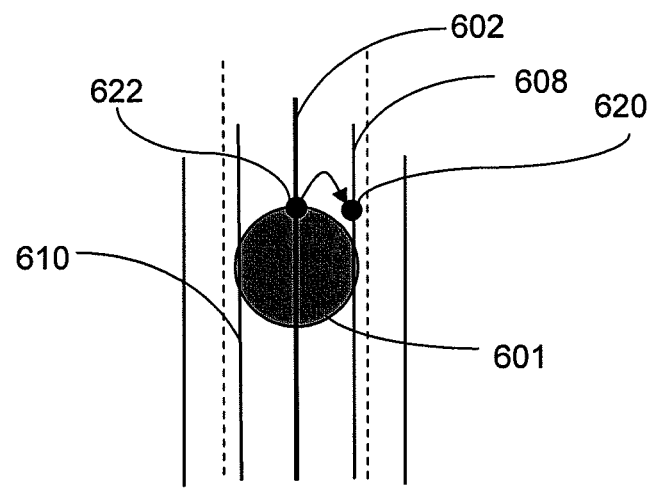
FIG. 6B illustrates constructing a blurring model for building a nodule template.
Figure 6C:
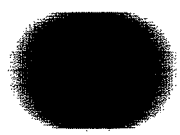
FIG. 6C shows an example nodule template based on a blurring model.

FIGS. 6A through 6C illustrate an example construct of a nodule template from a model of a nodule. In one example embodiment, nodules are detected by using spherical templates. However, other example embodiments may use templates of other shapes (e.g., ellipses, ovoids, or spheroids of various orientations) to detect nodules.

In FIG. 6A, model 601 is a spherical nodule model of certain size. Slice 602 is a center slice passing through the model, and slices 610 and 608 represent the slices before and after the center slice. That is, slices 610, 602, and 608 may be used to model sequential tomosynthesis image slices. Thickness 604 indicates the slice thickness of the center slice, which, in one example, is the same thickness for all slices, and interval 606 indicates a slice interval.

According to the imaging characteristics of tomosynthesis, slices before and after (e.g., adjacent to) the central slice of the nodule will show a blurred nodule shape. This effect may be simulated, for example, by adding a Gaussian-weighted contribution from each neighboring slice within a specific slice distance to each pixel that is under the consideration.

FIG. 6B represents an example procedure for constructing a nodule template to simulate the tomosynthesis blurring effect. Specifically, a template of uniform intensity may be generated. For pixel 620 on off-center slice 608, the intensity at model pixel 622 on slice 602 is weighted and added to the intensity at model pixel 620 of slice 608. Similarly, model pixels (not shown) on slice 610 contribute to the intensity on slice 608. In an example embodiment, the weight of the intensity is a Gaussian function of the slice distance, although other functions may also be employed as the weighting function, such as, for example, a linear function and a constant function.

In this manner, a pixel's intensity may be modeled by accounting for the intensities of other pixels in neighboring slices. FIG. 6C shows a blurred nodule template based on a Gaussian-function blurring model. However, as described above, to detect nodules of various shapes and sizes, templates corresponding to nodules of such size and shape ranges may be constructed and used in the performance of a nodule detection procedure.

Blurred nodule templates are matched against tomosynthesis images at step 504 to determine nodule candidates. As one example, a nodule detection unit (e.g., the nodule detection unit 110) may compare the blurred templates to the slices of a tomosynthesis scan. Such matching may be performed with respect to each individual pixel in a slice. A nodule candidate may be selected from image pixels based on certain criteria. For example, image pixels with matching scores (e.g., closeness of pixel intensity) above a certain threshold may be selected as nodule candidates. One specific (but not-limiting) example is selecting image pixels having Laplacian of Gaussian (LoG) convolution outputs above a predetermined threshold value.

At step 506, vessel templates of various diameters and orientations are generated. Like the nodule templates generated at step 502, the vessel templates are generated based on a blurring model that simulates the blurring effects visible in tomosynthesis images. As described above, in the tomosynthesis modality, vascular structures may be a dominant anatomic feature in an image. Accordingly, such vascular structures may interfere with nodule detection (e.g., a vascular structure may be a false positive for a nodule). Furthermore, nodules may be attached to vessels with varying degrees of attachment. Accordingly, identifying vascular structures thus may improve tomosynthesis nodule detection.

Rib templates also are generated at step 506. Like vascular structures, rib structures may be a dominant anatomic feature in a tomosynthesis image, and nodules may be attached to ribs. Thus, a rib template generated based on a blurring model may be used to identify rib structures.

Constructing vessel and rib templates may be performed in a manner similar to the nodule template construction at step 502. For example, the blurring model used at step 506 (e.g., a Gaussian-weighted intensity contribution) may be the same as the blurring model used at step 502. The shape and size of a vessel (or rib) model may be determined by anatomic and/or empirical knowledge. For example, a vessel model may be cylindrical, while a rib model may be cuboidal.

Figure 7A:
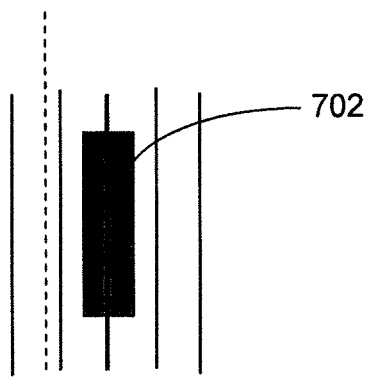
FIG. 7A illustrates a cylindrical vessel model.
Figure 7B:
FIG. 7B shows an example vessel template based on a blurring model.

FIG. 7A shows a cylindrical vessel model 702, and FIG. 7B shows an example construct of the resulting blurred vessel template. The blurred vessel template of FIG. 7B may be generated in a manner similar to the blurred nodule template of FIG. 6C.

Figure 7C:
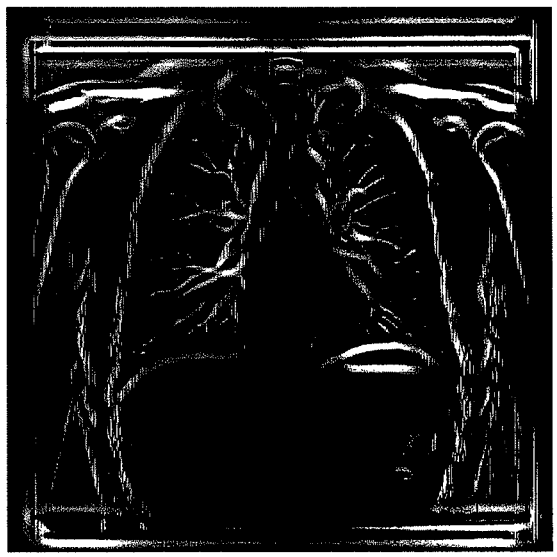
FIG. 7C illustrates an example nodule and vessel.

At step 508, the blurred vessel templates are convolved at each image pixel within a volume of interest (VOI) of each candidate nodule. That is, each blurred vessel template is compared to image elements (e.g., anatomic structures) in the actual tomosynthesis images. The maximum convolution output among all of the vessel templates is chosen as the output value at each pixel. The convolution thus generates a ridge map. An example ridge map is shown in FIG. 7C. In general, a high intensity indicates that a pixel likely corresponds to a vessel, while a low intensity indicates that a pixel likely does not.

Figure 7D:
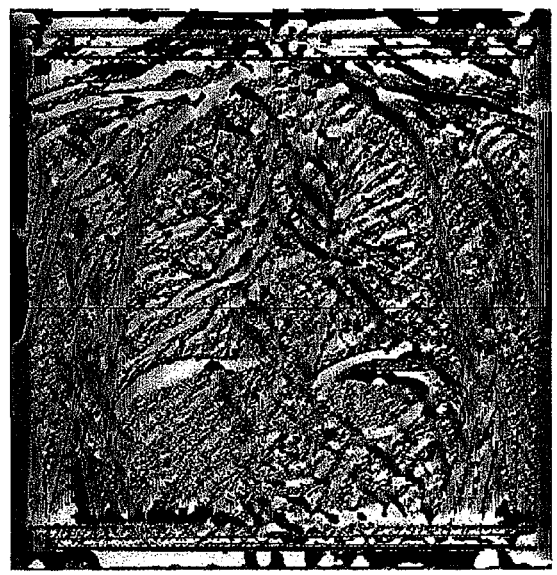
FIG. 7D shows intensity profiles of the nodule and vessel illustrated in FIG. 7C.

An orientation map also is generated at step 508. The orientation map is the orientation corresponding to vessel template of the maximum convolution output. Vascular structures typically generate a strong ridge magnitude. Accordingly, the strongest ridge values in the local vicinity (e.g., the VOI) correspond to vascular structures at the focal plane of each tomosynthesis slice. An example orientation map is shown in FIG. 7D. In general, the intensity at each pixel is correlated with one template of the templates convolved at each pixel.

At step 510, a search in the slice direction (e.g., along the z-axis) is performed. This search determines the slice having the strongest ridge (e.g., the slice which produces the strongest output in vessel template matching) in a vicinity of a nodule candidate. Thus, the search at step 510 determines which slice corresponds to the slice in which the vessel is located. In other words, the search determines the dominant spatial orientation of the ridge.

Step 512 determines whether nodule candidates are attached to a vascular structure based on a proximity measurement. The proximity measurement may determine, for example, how close a nodule is to a ridge line of the ridge map generated at step 508. In general, a ridge line is comprised of points of high intensity on the ridge map, and thus the ridge lines coincide with the centers of vessels. Thus, one example proximity measurement is a Euclidean distance between the location of a nodule candidate and a ridge line. A nodule candidate may be determined to be attached to a vascular structure where, for example, the proximity of the candidate is below a predetermined threshold.

Figures 7E, 7F:
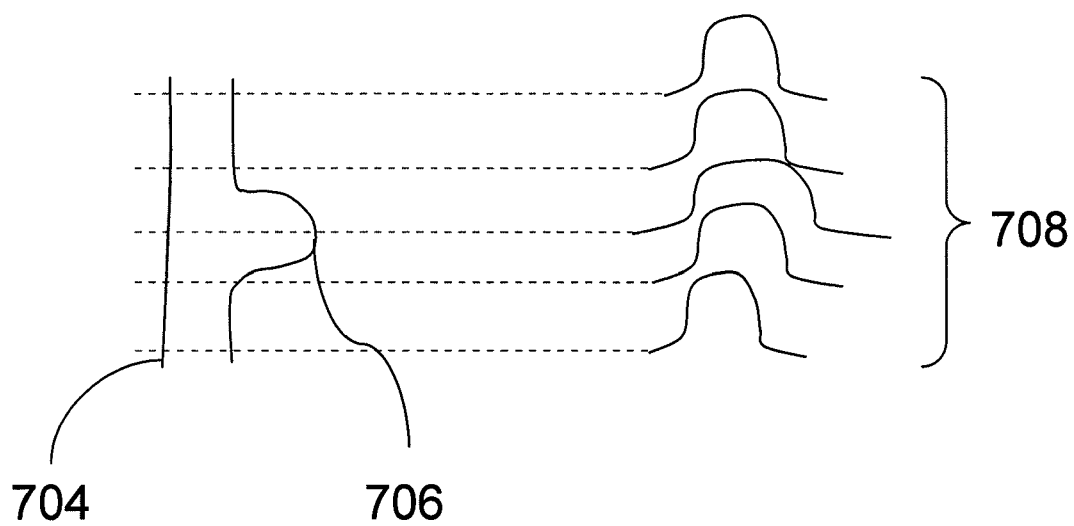
FIG. 7E shows an illustration of a central slice of a nodule that includes a dominant spatial orientation of a vessel.
FIG. 7F shows five intensity profiles of the nodule and vessel of FIG. 7E.

At step 514, intensity profiles orthogonal to the dominant spatial orientations of the ridges are computed for nodules determined to be attached to a vascular structure. The computation is made at the focal plane of the nodules (e.g., the central slice of a nodule). FIG. 7E shows an illustration of a central slice of a nodule 708 that includes the dominant spatial orientation of a vessel 706. FIG. 7F shows five intensity profiles 710 of the nodule 708 and the vessel 706.

At step 516, a width is estimated for each intensity profile computed a step 514. The width is based on a segmentation performed on the intensity profile. The segmentation may be based on a threshold such as, for example, a threshold that is a fixed percentage of the maximum intensity of the nodule candidate. From the segmented nodule, changes in widths along the direction of the ridge lines are analyzed. For a nodule candidate connected to a vascular structure, such widths may correspond to a pattern of increase and/or decrease in value along a ridge line. This pattern is quantified and analyzed automatically in order to remove false positive candidates at step 518. As one example, the quantification may include calculation of statistics pertaining to width changes (e.g., maximum width, minimum width, mean width, and standard deviation). These statistics may be compared by the analysis, for example, to empirically-determined ranges, minimum values, and/or maximum values.

Similarly, rib structures obtained during lung segmentation, as discussed in connection with FIGS. 3J through 3L, may be used at step 520 to distinguish nodule candidates attached to ribs from rib structures. Step 520 may incorporate procedures similar to those performed at steps 508 to 518 but using rib templates.

In an example embodiment, the blurred nodule templates are further used to compare nodule centroids and sizes at each cross-section. This comparison is performed at steps 528 through 532. For example, each candidate nodule may be segmented (e.g., binarized) from a tomosynthesis image at step 528 using, as one example, region growing. For each candidate nodule, the nodule template which best matches that nodule may then be segmented using the same binarization method used to segment the candidate nodule. Having segmented the candidate nodules and their best-matching templates, at step 530 each segmented nodule is checked to its segmented matching template for consistency. In one example embodiment, the consistency check measures the cross-correlation between the two binarized images. False positives may be determined as having a correlation value below a predetermined threshold, and thus removed.

At step 532, false positives may be further removed based on pattern classification. In one example embodiment, measurements, patterns, and/or outputs from any of the preceding steps (e.g., convolution outputs from steps 504 and 508, and correlations between binary images at step 528) may be used to train a pattern classification module (e.g., a pattern classification procedure performed by nodule detection unit such as the nodule detection unit 110 of FIG. 1). Pattern classification may be performed, for example, by a k-nearest neighbor algorithm such as that described in T. M. Cover and P. E. Hart, *Nearest neighbor pattern classification,* 13 IEEE Transactions on Information Theory, 21-27 (1967), the content of which is incorporated by reference herein in its entirety as if set forth fully herein.

At step 534, the nodule candidates remaining from step 532 are identified as nodules. Other information related to the nodules, such as nodule location and size, may be obtained from preceding steps, such as steps 504 and 528.

The foregoing describes in detail example aspects herein, in particular, a lung segmentation procedure based on chest tomosynthesis scans, and a lung nodule detection procedure suitable for use with tomosynthesis scans. By virtue of these procedures, an enhanced diagnosis of a patient may be made using tomosynthesis images.

Figure 8:
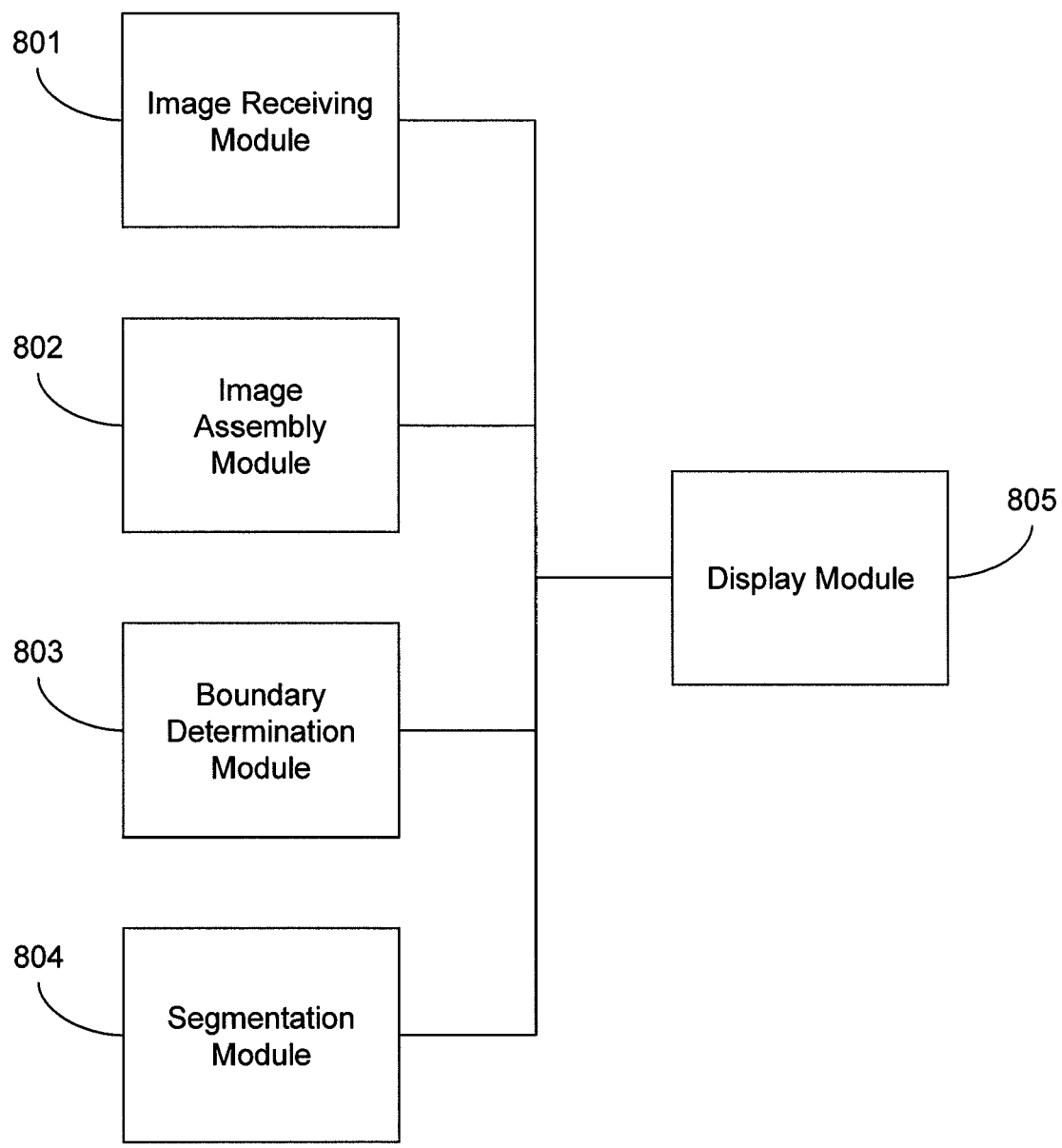
FIG. 8 is a diagram of functional modules configured in accordance with the flow diagram of FIG. 3A.
Figure 9:
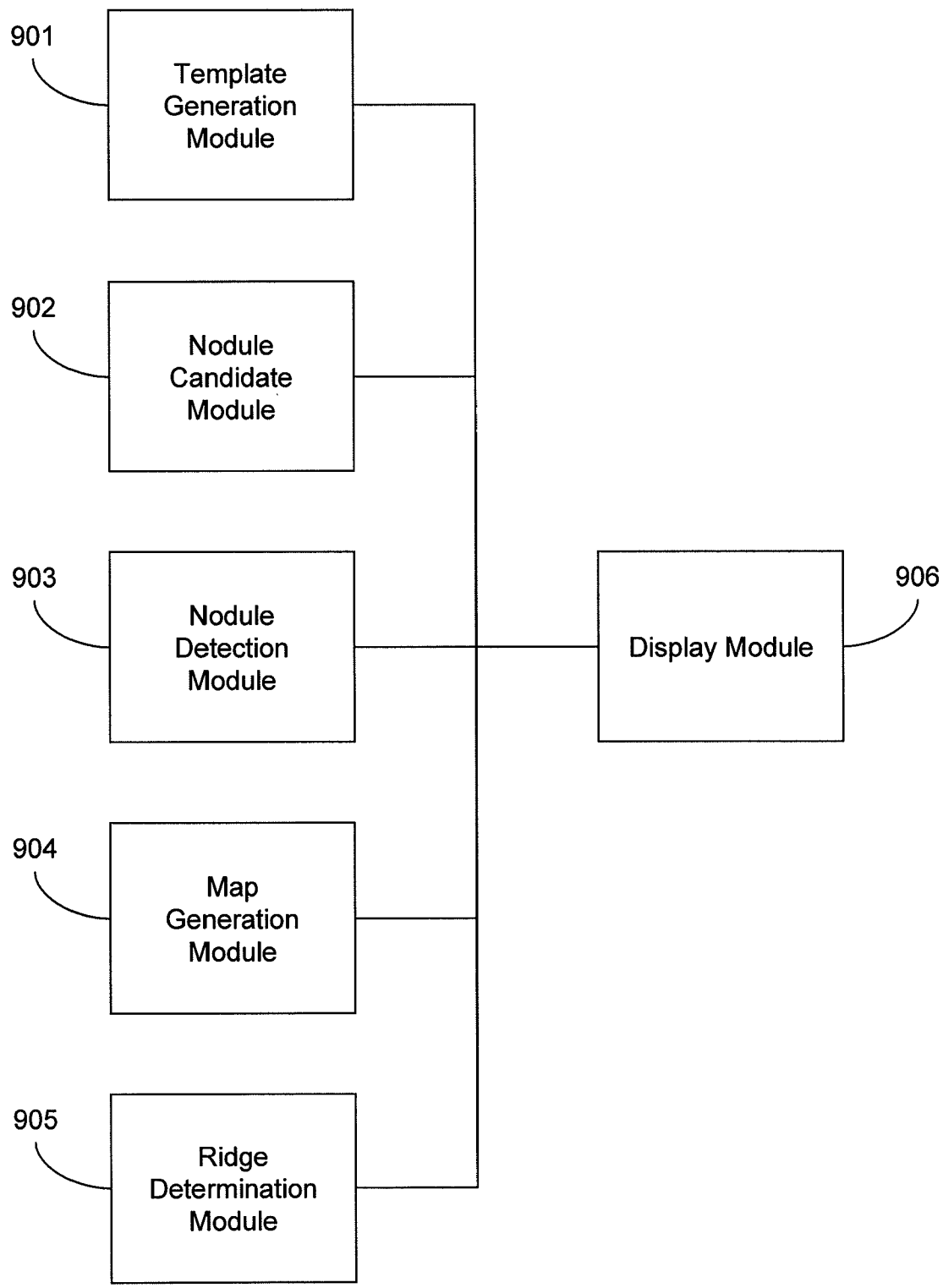
FIG. 9 is a diagram of functional configured in accordance with the flow diagram of FIG. 5.

FIGS. 8 and 9 show diagrams of functional modules configured in accordance with various example embodiments. The modules (whether individually or configured together) shown in these figures may comprise, or form, one or more of the components of the system of FIG. 1. As one example, the modules of FIG. 8 may comprise the image receiving unit 106 of FIG. 1 and lung segmentation unit 108 of FIG. 1, and the modules of FIG. 9 may comprise the blurred model nodule detection unit 110 of FIG. 1.

In one example embodiment, the modules of FIG. 8 are configured in accordance with the flow diagram of FIG. 3A. The modules include an image receiving module 801, a three-dimensional (3D) image generation module 802, a boundary determination module 803, a segmentation module 804, and a display module 805. Each module is communicatively coupled to the other modules. The image receiving module 801 may be configured to perform tasks associated with step 310. The image assembly module 802 may be configured to perform tasks associated with steps 324 and 326. The boundary determination module 803 may be configured to perform tasks associated with steps 310 through 326. The segmentation module 804 may be configured to perform tasks associated with step 326. The display module 805 may be configured to display outputs (and/or receive inputs) associated with tasks performed by the other modules.

The modules of FIG. 9, in one example, are configured in accordance with the flow diagram of FIG. 5. The modules include a template generation module 901, a nodule candidate module 902, a nodule detection module 903, map generation module 904, a ridge determination module 905, and display module 906. Each module is communicatively coupled to the other modules. The template generation module 901 may be configured to perform tasks associated with steps 502 and 506. The nodule candidate module 902 may be configured to perform tasks associated with steps 504, 512, 518, 520, 530, and 532. The nodule detection module 903 may be configured to perform tasks associated with step 534. The map generation module 904 may be configured to perform tasks associated with step 508. The ridge determination module may be configured to perform tasks associated with steps 510 through 514. The display module 906 may be configured to display output associated with tasks performed by the other modules The components of FIG. 1 and the modules of FIGS. 8 and 9 each may include software, hardware, or a combination thereof, and at least some of those modules may be incorporated within a data processing system, and example of which is discussed below in connection with FIG. 10. As one example, a module may be embodied, at least in part, in computer program instructions stored in a storage device, or may be made up of a hardware component(s) located in or in association with a processor.

Figure 10:
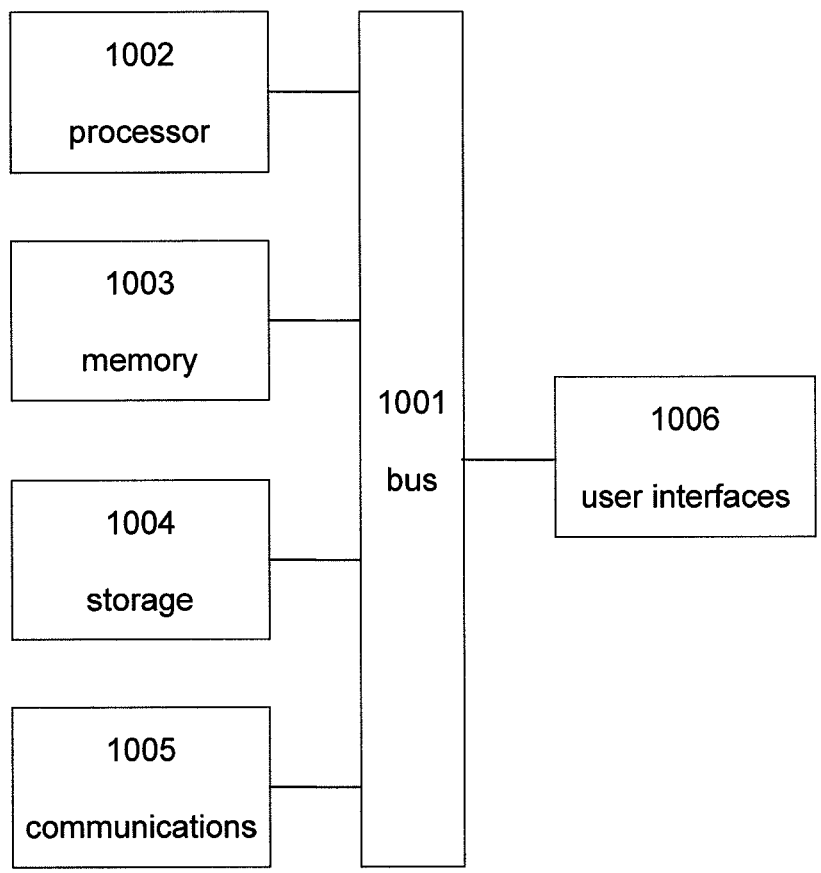
FIG. 10 is a diagram of an example computing architecture.

FIG. 10 is a diagram of an example data processing system. The system, in one example embodiment, may form at least part of one or more of the components of FIG. 1. The system of FIG. 10 includes a processor 1002, a memory 1003, a storage device 1004, a communications device 1005, and user interfaces 1006, all of which are coupled to a bus 1001.

The processor 1002 can communicate with the other components of the architecture through the bus 1001. The storage device 1004 includes one or more machine-readable media. The storage device 1004 can be configured to read and write data including program instructions that may be executed by the processor 1002 and operating systems (e.g., Microsoft Windows, UNIX) that allow the processor 1002 to control the operation of the other components. The communications device 1005 can be configured to allow the processor 1002 to communicate with, e.g., a network and the internet. The user interfaces 1006 can include input devices (e.g., keyboards, mice, joysticks, trackpads, stylus tablets, microphones, and cameras) and output devices (e.g., video displays, printers, and speakers). The user interfaces 1006 can comprise, at least in part, any of the units and/or modules discussed herein.

The processor 1002 may be configured to perform any of the procedures described herein. For example, the procedures may be stored on the storage device in the form of machine-readable program instructions. To execute a procedure, then, the processor loads the appropriate instructions, as stored on the storage device 1004, into the memory 1003, and then executes the loaded instructions.

In the foregoing description, example aspects of the invention are described with reference to specific example embodiments thereof. The specification and drawings are accordingly to be regarded in an illustrative rather than in a restrictive sense. It will, however, be evident that various modifications and changes may be made thereto, in a computer program product or software, hardware, or any combination thereof, without departing from the broader spirit and scope of the present invention.

Software embodiments of example aspects described herein may be provided as a computer program product, or software, that may include an article of manufacture on a machine accessible or machine readable medium (memory) having instructions. The instructions on the machine accessible or machine readable medium may be used to program a computer system or other electronic device. The machine-readable medium may include, but is not limited to, floppy diskettes, optical disks, CD-ROMs, and magneto-optical disks or other types of media/machine-readable medium suitable for storing or transmitting electronic instructions. The techniques described herein are not limited to any particular software configuration. They may find applicability in any computing or processing environment. The terms "machine readable medium," or "memory" used herein shall include any medium that is capable of storing, encoding, or transmitting a sequence of instructions for execution by the machine and that cause the machine to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result. In other embodiments, functions performed by software can instead be performed by hardcoded modules, and thus the invention is not limited only for use with stored software programs.

In addition, it should be understood that the figures illustrated in the attachments, which highlight the functionality and advantages of the present invention, are presented for example purposes only. The architecture of the example aspect of the present invention is sufficiently flexible and configurable, such that it may be utilized (and navigated) in ways other than that shown in the accompanying figures.

In addition, it is not necessary that the procedures performed with a computer, and instead they can be performed by a human operator.

Although example aspects of this invention have been described in certain specific embodiments, many additional modifications and variations would be apparent to those skilled in the art. It is therefore to be understood that this invention may be practiced otherwise than as specifically described. Thus, the present example embodiments, again, should be considered in all respects as illustrative and not restrictive.

What is claimed is:

1. A procedure performed by a processor operating under the control of a program stored in a memory, for detecting nodules in tomosynthesis images, comprising:
   the processor generating at least one blurred nodule template;
   the processor generating at least one blurred vessel template;
   the processor determining, based on the at least one blurred nodule template, a nodule candidate in a three-dimensional (3D) image of a lung assembled from a plurality of tomosynthesis images; and
   the processor determining, based on the at least one blurred vessel template, that the nodule candidate is a nodule in the 3D image of the lung, the nodule in the 3D image of the lung representing a lung nodule.

2. A procedure according to claim 1, wherein determining the nodule candidate includes comparing the at least one nodule template to the 3D image of the lung.

3. A procedure according to claim 1, further comprising:
   the processor generating at least one ridge map based on the at least one blurred vessel template;
   the processor generating at least one orientation map based on the at least one blurred vessel template;
   the processor determining, in the at least one ridge map and the at least one orientation map, a dominant orientation of a ridge;
   the processor determining that the nodule candidate is proximate to a dominant ridge, based on the at least one ridge map and the at least one orientation map.

4. A procedure according to claim 3, wherein determining that the nodule candidate is proximate to the dominant ridge includes
   (i) generating at least one intensity profile of the dominant orientation of the ridge, and
   (ii) analyzing the at least one intensity profile to obtain a width change of the nodule candidate.

5. A procedure according to claim 1, further comprising:
   the processor determining a focal plane image of the lung from among the plurality of tomosynthesis images;
   the processor determining a plurality of boundaries of the lung in the focal plane image based on gradients of pixels in the focal plane image and a sequence of best-path algorithms cascaded together, at least one path determined by at least one of the algorithms providing constraint for at least one other path;
   the processor assembling the plurality of tomosynthesis images to obtain a three-dimensional (3D) image of the lung;
   the processor determining at least one boundary of at least one rib in the 3D image of the lung based on the boundaries of the lung in the focal plane image and a best-path algorithm; and
   the processor generating a lung segment based on the plurality of boundaries of the lung in the focal plane image and the at least one boundary of the at least one rib.

6. A procedure according to claim 5, further comprising:
   the processor receiving the plurality of tomosynthesis images.

7. A procedure according to claim 6, further comprising:
   the processor producing a result image that includes at least one nodule; and
   displaying the result image on a display.

8. A system for nodule detection in tomosynthesis images comprising:
   a processor, operating under the control of a program stored in a memory, to:
   generate at least one blurred nodule template and at least one blurred vessel template;
   determine, based on the at least one blurred nodule template, a nodule candidate in a 3D image of a lung that is assembled from a plurality of tomosynthesis images; and
   determine, based on the at least one blurred vessel template, that the nodule candidate is a nodule in the 3D image, the nodule in the 3D image representing a lung nodule.

9. A system according to claim 8, wherein the processor also operates under the control of the program to
   (i) segment a nodule template,
   (ii) segment the nodule candidate, and
   (iii) compare the segmented nodule template to the segmented nodule candidate.

10. A system according to claim 9, wherein the processor further operates under the control of the program to:
    generate at least one ridge map based on the at least one blurred vessel template,
    generate at least one orientation map based on one of the at least one blurred vessel template;
    determine a dominant ridge in one of the plurality of tomosynthesis images, and
    determine that the nodule candidate is proximate to the dominant ridge.

11. A system according to claim 8,
    wherein the processor further operates under the control of the program to:
    (i) determine a focal plane image of the lung from among the plurality of tomosynthesis images,
    (ii) determine a plurality of boundaries of the lung in the focal plane image based on gradients of pixels in the focal plane image and a sequence of best-path algorithms cascaded together, at least one path determined by at least one of the algorithms providing constraint for at least one other path,
    (iii) assemble the plurality of tomosynthesis images to obtain a three-dimensional (3D) image of the lung,
    (iv) determine at least one boundary of at least one rib in the 3D image of the lung based on the boundaries of the lung in the focal plane image and a best-path algorithm, and
    (v) generate a lung segment based on the plurality of boundaries of the lung in the focal plane image and the at least one boundary of the at least one rib.

12. A system according to claim 11,
    wherein the processor also operates under the control of the program to receive the plurality of tomosynthesis images.

13. A system according to claim 12,
wherein the processor also operates under the control of the program to produce a result image that includes at least one nodule and
wherein the system further comprises a display arranged to display the result image.

* * * * *